Nov. 29, 1938.   W. RAISCH   2,138,120
INCINERATION
Filed Oct. 30, 1936   2 Sheets-Sheet 1

INVENTOR
William Raisch
BY
ATTORNEY

Nov. 29, 1938.　　　W. RAISCH　　　2,138,120
INCINERATION
Filed Oct. 30, 1936　　2 Sheets-Sheet 2
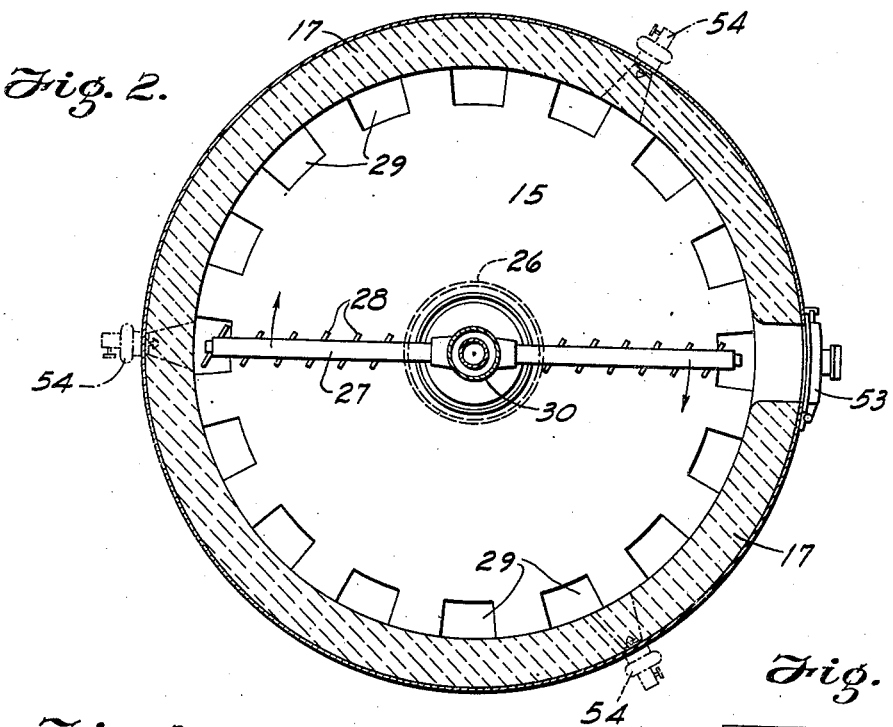
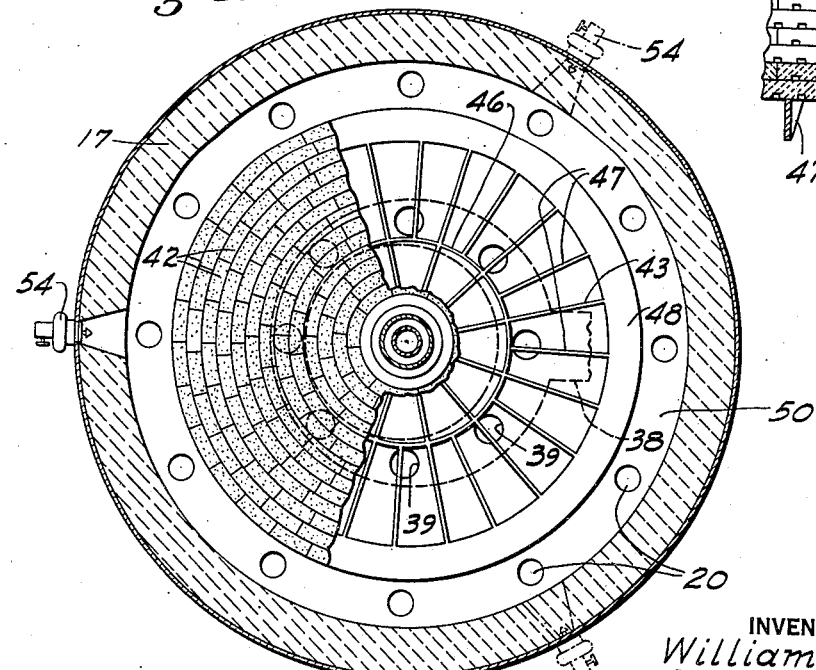
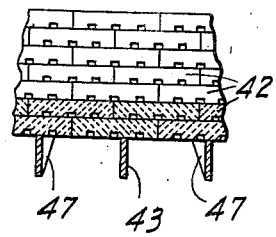
INVENTOR
William Raisch
BY Louis L. Ansart
his ATTORNEY Patented Nov. 29, 1938

2,138,120

UNITED STATES PATENT OFFICE 2,138,120

INCINERATION

William Raisch, New York, N. Y., assignor to Underpinning & Foundation Co., Inc., New York, N. Y., a corporation of New York Application October 30, 1936, Serial No. 108,428

1 Claim. (Cl. 110—13)

The present invention relates to incineration and more particularly to apparatus of the multiple-hearth type and to a process involving a preliminary or drying stage in which moisture and volatile constituents are driven off from the material to be treated, as by subjecting the material to heating and contact with a stream of air, preferably preheated and a final stage in which the dried material is completely burned.

The principal objects are to provide novel, advantageous, and efficient forms of apparatus and processes for effecting treatment of the general character specified.

While applicable to the treatment of various materials, the present invention is particularly adapted for the disposal and destruction of waste materials such as garbage and sewage solids in the form of sludge or in the form of screenings having high moisture content.

In carrying out the invention, use may be made of a vertical furnace having an upper drying section of the tiered multiple-hearth type comprising vertically spaced hearths with outlets at the center of one and at the periphery of the next adjoining hearth either above or below, the lowermost hearth having a central opening, and a burning section having a grate with a raised central portion and a grate surface inclined downwardly from the raised central portion toward the sides of the furnace.

Also air, preferably preheated, is introduced at the top of the drying section and withdrawn from the lower part thereof, and air, preferably preheated, is introduced beneath the burning or fire grate and passed upwardly therethrough, the gases of combustion being withdrawn from the upper part of the burning section. Burners may be used wherever needed to heat the various compartments of the drying section or the main compartment of the burning section. If desired the air and vapors passing from the drying section may be introduced beneath the grate of the burning section to aid combustion and insure the elimination of noxious odors. When the conditions are such that no obnoxious odors are produced by treatment in the dryer, the air withdrawn from the dryer may be discharged to the open air.

Other objects, features and advantages will appear upon consideration of the following description and of the drawings in which:

Fig. 2 is a section taken on the line 2—2 of Fig. 1;

Fig. 3 is a section taken on the line 3—3 of Fig. 1; and

Fig. 4 is a section taken on the line 4—4 of Fig. 1.

Figure 1:
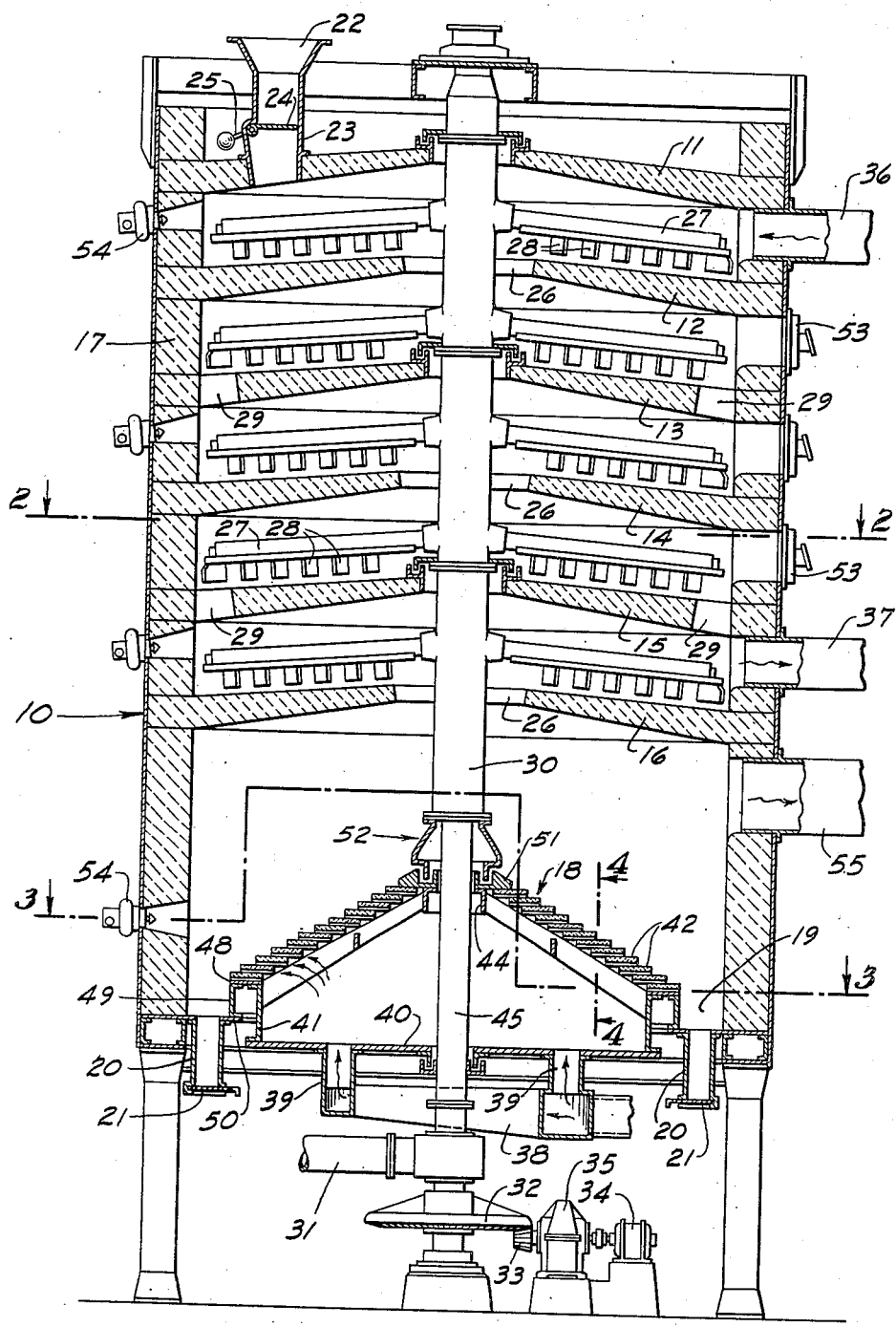
Fig. 1 is a vertical section of a furnace embodying the present invention in a preferred form.

Referring to the drawings, the invention may be embodied in a furnace 10 having a multiple hearth drying section provided with a top 11, hearths 12, 13, 14, 15 and 16 carried by peripheral wall 17 of the furnace. The furnace also includes a burning section provided with a grate 18 having a raised center and a sloping grate surface down which the ashes will work to a peripheral channel 19 provided with discharge chutes 20 normally closed by gates or slides 21.

The material to be treated may be introduced into the furnace and deposited upon the uppermost hearth 12 through a hopper 22 and chute 23 extending through the top 11 of the furnace and provided with a pivoted door or gate 24 normally held in closed position by suitable means such as a weighted arm 25. As soon as a sufficient amount of material to overcome the action of the weighted arm 25 collects on the door or gate 24, the door swings downwardly about its pivotal support and permits the material on the door to fall to the hearth 12. As illustrated, this material falls on the hearth 12 near its periphery and is worked inwardly to a central discharge opening 26 of the hearth 12 by suitable rabbling means including one or more radial arms 27 and inclined blades 28.

Below the hearth 12 the hearths 13 and 15 are provided with peripheral outlets 29 and the hearths 14 and 16 are provided with central outlets 26, corresponding to that of the hearth 12. The material on the hearths 13, 14, 15 and 16 is moved towards the corresponding outlets by suitable rabbling means similar to that above the hearth 12, the blades 28 above the hearths 14 and 16 having the same inclination as those above the hearth 12, and the blades 28 above the hearths 13 and 15 being so inclined as to carry the material outwardly on the corresponding hearths to the peripheral outlets 29. The rabbling arms 27 are supported and operated by means of a hollow vertical shaft 30 passing through the central parts of the central outlets 26 of the hearths 12, 14 and 16 and through smaller openings in the top 11 and the hearths 13 and 15, suitable gas seals being provided where the shaft 30 passes through the top 11 and the hearths 13 and 15.

Air may be supplied to the interior of the shaft 30 through a duct 31 and the shaft may be rotated by means including a bevel gear 32 thereon, a bevel gear 33 meshing with the bevel gear 32, a motor 34 and a speed changer 35 interposed in the driving connection between the motor 34 and the bevel gear 33. In the drying section there may be provided a duct 36 communicating with the uppermost compartment of the drying section and a duct 37 communicating with the lowermost compartment of the drying section. Air preferably preheated may also be supplied beneath the grate 18 by means including a manifold or distributing ring 38 and branch ducts 39 passing through a floor 40.

The floor 40 is attached to an annular channel member 41 which serves as part of a support for grate members 42 having inclined radial members 43 extending from the annular member 41 upwardly to an annular member or ring 44 surrounding the reduced lower end 45 of the shaft 30. The supporting structure for the grate members 42 also includes a ring 46 connecting the radially extending members 43 and supporting the inner ends of inclined radial members 47 attached at their other ends to the annular member 41. At its upper edge the annular member 41 is attached to a flat annular member 48 which in turn is supported by an annular member 49 resting on the inner edge of a flat annular member 50 supoprted in the wall 17 of the furnace 10.

The members 42 are preferably in the form of flat blocks with channels in their lower sides and may be of any suitable material such as cast iron. In assembling the grate a row of the blocks or grate members 42 which are suitably curved, is placed on a flat annular member 48 in the form of a circle and this circular arrangement of blocks serves to support a corresponding circle of blocks of slightly less diameter, the blocks being arranged to rest at their inner edges on the inclined radial members 43 and 47. This building up is continued until the stepped grate is completed. Over the uppermost circle of blocks 42 is an annular member 51 which serves as part of a gas seal 52.

The air entering through the duct 36 may be preheated and as it enters the drying section may be brought to any suitable temperature is any suitable manner as by the addition of cooled air. By keeping the temperature in the drying section from exceeding a certain upper limit, the production of gases with noxious odors may in many cases be avoided. In the event, however, that noxious odors are produced by the drying of the material in the drying zone, the air laden with such gases and odors may be drawn out through the duct 37 and introduced into the manifold 38 from which it will pass into the space beneath the hearth members 42.

It should be noted that due to the maintenance of communication between the dryer and the burning furnace through the outlet 26 in the lowermost hearth 16, there may be an interchange of air and gases through the hearth 16.

Doors 53 may be provided for any of the compartments and also burners 54 may be provided for any or all of the hearths in the drying and burning sections.

In general, the operation is substantially as follows: Material thrown into the hopper 22 falls on the pivoted gate 24 and when its weight becomes great enough to overcome the resistance by weighted arm 25, the door 24 will open and the material will fall to the hearth 12 and will be gradually rabbled or worked inwardly to the central outlet 26 where it will pass downwardly into the next lower compartment. The material will then be worked outwardly along the hearth 13 to the outlet or outlets 29, inwardly on the surface of the hearth 14, outwardly on the hearth 15, and inwardly on the hearth 16.

At starting or any other time, the temperature may be raised by use of suitable means such as burners 54 provided at some or all of the compartments in the drying and burning sections of the furnace. Preheated air may be passed at any suitable temperature into the uppermost zone of the furnace, passed downwardly through the furnace and then withdrawn from the furnace through the pipe 27. The material in the drying section gradually works down to the hearth 16 and will then be rabbled through the opening 26 to the fire grate 18 which is arranged so as to facilitate heating and burning of the material and the gradual working down of the material to the side wall of the furnace. During the burning of material in the furnace 18 the air either preheated or otherwise may be passed upwardly into the space beneath the hollow hearth grate structure and after passing through the openings in the grate members 42 and through the bed of burning material thereon, will pass outwardly through the duct 55. As the combustible material burns, at its upper surface it will gradually work down along the sloped incline into the channel 19 and will then be discharged from the apparatus.

It should be understood that various changes may be made in the construction and arrangement and that certain parts may be used without others without departing from the true scope and spirit of the invention.

Having thus described my invention, I claim:

In a furnace of the class described, a drying section separated into compartments by a plurality of vertically spaced hearths of which alternate hearths have central outlets and peripheral outlets respectively and the lowermost hearth is one with a permanently open central outlet, a burning section having a conical grate receiving dried material directly through said permanently open central outlet, an air inlet at the upper part of said drying section, an air outlet for discharging from the interior of the furnace air and vapor from the lower part of the drying section, a combustion gas outlet at the upper part of said burning section, and air-supply means below said grate.

WILLIAM RAISCH.